(12) United States Patent
Takano et al.

(10) Patent No.: US 6,748,753 B2
(45) Date of Patent: Jun. 15, 2004

(54) AIR CONDITIONER

(75) Inventors: Yoshiaki Takano, Kosai (JP); Satoshi Izawa, Anjyo (JP); Shun Kurata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/374,275

(22) Filed: Feb. 26, 2003

(65) Prior Publication Data
US 2003/0159449 A1 Aug. 28, 2003

(30) Foreign Application Priority Data

Feb. 27, 2002 (JP) ...................................... 2002-051406
May 23, 2002 (JP) ...................................... 2002-149610

(51) Int. Cl.⁷ ............................................... F25B 41/00
(52) U.S. Cl. .............................. 62/174; 62/159; 62/160; 165/42; 165/43
(58) Field of Search ................... 62/174, 196.4, 62/159, 160, 197, 278; 165/42, 43, 62

(56) References Cited

U.S. PATENT DOCUMENTS

| | | | |
|---|---|---|---|
| 5,291,941 A | * | 3/1994 | Enomoto et al. ............. 165/62 |
| 6,105,375 A | | 8/2000 | Takano et al. |
| 6,148,632 A | * | 11/2000 | Kishita et al. ............. 62/323.1 |
| 6,237,681 B1 | * | 5/2001 | Takano et al. ............. 165/241 |
| 6,244,060 B1 | * | 6/2001 | Takano et al. ............. 62/196.4 |
| 6,247,322 B1 | * | 6/2001 | Ban et al. ................... 62/228.3 |
| 6,250,093 B1 | * | 6/2001 | Fujii et al. .................. 62/228.3 |
| 6,250,094 B1 | * | 6/2001 | Ban et al. ................... 62/228.3 |
| 6,263,687 B1 | * | 7/2001 | Ban et al. ................... 62/228.3 |
| 6,266,965 B1 | * | 7/2001 | Takano et al. ................. 62/126 |
| 6,526,771 B2 | * | 3/2003 | Takano et al. ............. 62/228.3 |
| 6,584,785 B1 | * | 7/2003 | Karl ............................. 62/117 |

FOREIGN PATENT DOCUMENTS

JP  5-272817  10/1993
JP  2002277066 A  *  9/2002

* cited by examiner

Primary Examiner—William E. Tapolcai
Assistant Examiner—Mohammad M. Ali
(74) Attorney, Agent, or Firm—Harness, Dickey & Pierce, PLC

(57) ABSTRACT

In the air conditioner of the present invention, both the normal cooling mode operation, in which refrigerant discharged from the compressor 1 is made to flow in the condenser 2, and the heating mode operation conducted by the hot gas bypass, in which refrigerant is made to bypass the condenser and directly flow in the evaporator 4 via the throttle 17, can be conducted. Before this heating mode operation, after the compressor is turned on for a predetermined period of time in the cooling mode, the compressor is turned off for a predetermined period of time, so that refrigerant residing in the condenser can be recovered into the hot gas cycle, and then a hot gas operation, which is the heating mode, is conducted.

6 Claims, 11 Drawing Sheets

※ (DISCHARGE PRESSURE-SUCTION PRESSURE)

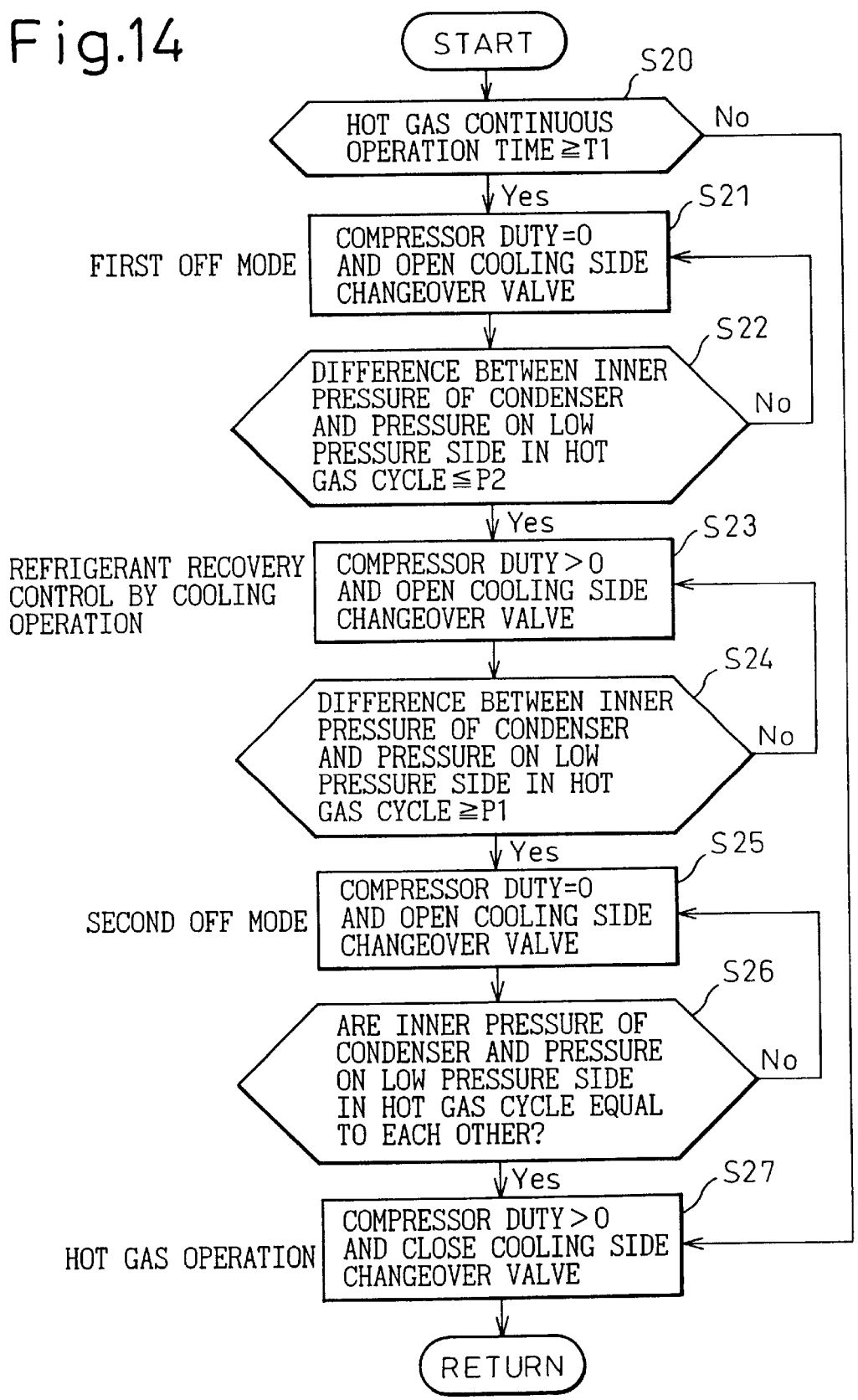

AIR CONDITIONER

BACKGROUND OF THE INVENTION

1. Field of the Invention

The present invention relates to an air conditioner having a hot gas bypass function of heating air when a gas refrigerant of high temperature and pressure, which has been discharged from a refrigerant compressor, is decompressed and introduced into a refrigerant evaporator and the refrigerant evaporator is used as a radiator from which the heat of the gas refrigerant is radiated. More particularly, the present invention relates to an air conditioner for vehicle use which is preferably mounted on a vehicle.

2. Description of the Related Art

In a conventional air conditioner for vehicle use, warm water (engine coolant) is circulated in a heat exchanger used for heating in winter, and air to be conditioned is heated by this heat exchanger for heating while the warm water is used as a heat source. In this case, when the temperature of the warm water is low, air at low temperature is blown out into a passenger compartment, that is, it is impossible to provide a sufficiently large heating capacity.

In order to solve the above problems, conventionally, an air conditioner is proposed in which the heating capacity is exhibited by providing a hot gas bypass. In this conventional air conditioner, when the temperature of warm water is low in the case of starting an engine, gas refrigerant (hot gas) compressed by a compressor in the refrigerating cycle is introduced into an evaporator which bypasses a condenser, and heat is emitted from the gas refrigerant to air to be conditioned by the evaporator, so that a heating function can be exhibited. However, in the hot gas cycle in which gas refrigerant of high temperature and pressure in the refrigerating cycle is used, the heating capacity is greatly affected by whether or not a sufficiently large quantity of refrigerant is charged into the air conditioner. For example, when a sufficiently large quantity of refrigerant is not charged, the heating capacity is lowered, and when an excessively large quantity of refrigerant is charged, the compressor is too frequently turned on and off, and the durability of the magnet switch of the compressor is deteriorated.

In order to solve the above problems, Japanese Unexamined Patent Publication No. 5-272817 discloses the following techniques. A high pressure on the discharging side of the compressor is detected, and it is judged whether a quantity of circulating refrigerant is sufficient or insufficient in the heating mode conducted by the hot gas bypass. In the case where the quantity of refrigerant is too large, the refrigerant is discharged onto the condenser side. In the case where the quantity of refrigerant is too small, the residing refrigerant is recovered from the condenser side. Recovery of the residing refrigerant is specifically conducted in such a manner that the entry side of the condenser is opened and the entry side of the hot gas bypass path is closed, that is, the air conditioner is set in the normal cooling mode, and then the compressor is operated.

However, in the heating mode conducted by the hot gas bypass, high pressure on the discharging side of the compressor fluctuates by factors such as a heat load in the cycle, rotary speed of the compressor, throttle diameter of the decompression means in the hot gas bypass path and so forth. Therefore, it is difficult to appropriately judge only by the high pressure whether the quantity of refrigerant is sufficient or insufficient.

In addition to that, after the hot gas bypass operation has been started, in order to stabilize the operation of high pressure, it takes a long time. At least 5 minutes is required to stabilize the operation at high pressure. In this period of time, the heating capacity is insufficient due to lack of the refrigerant. Further, a sufficiently large quantity of oil is not returned to the compressor, which causes a failure of lubrication of the compressor.

When the residing refrigerant is recovered in the case of heating in winter, the outside temperature is low and a heat load for cooling is very light. Therefore, a difference between high and low pressure in the refrigerating cycle is very small. For the above reasons, in the case where a variable displacement type compressor, in which a displacement of the compressor is changed by utilizing a difference between high and low pressure in the refrigerating cycle, is used for the compressor, the displacement is not increased, that is, the displacement is kept small because the difference between high and low pressure in the refrigerating cycle is small. Accordingly, it becomes impossible to recover the residing refrigerant.

In order to solve the above problems, the present applicant has proposed the refrigerating cycle disclosed in U.S. Pat. No. 6,105,375. In this conventional refrigerating cycle device, when the heating mode conducted by the hot gas bypass is started, when the compressor is operated while both the entry side of the condenser and that of the hot gas bypass path are closed, the residing refrigerant existing on the condenser side is forcibly recovered onto the evaporator side.

However, in the case where recovery control of recovering the residing refrigerant is conducted as described above, as the compressor is continuously driven under the condition that only a small quantity of refrigerant and oil exist in the hot gas cycle, it becomes impossible to supply a necessary quantity of oil to the compressor for a long period of time. In this case, failure of lubrication is caused in the compressor, which leads to abrasion or breakdown of parts of the compressor. In the worst case, the compressor is locked.

Conventionally, in the case where hot gas bypass operation is conducted for more than a predetermined period of time, there is a possibility that refrigerant leaks from the electromagnetic valve to the condenser side. In this case, the quantities of refrigerant and oil in the hot gas cycle are decreased, and the hot gas capacity is lowered and, further, abrasion of the compressor is caused due to a reduction in the quantity of oil circulated.

SUMMARY OF THE INVENTION

The present invention has been accomplished to solve the above problems. It is an object of the present invention to provide an air conditioner capable of effectively recovering refrigerant and oil, which reside in a condenser, immediately before the start of hot gas operation, by driving a compressor for a short period of time.

It is another object of the present invention to provide an air conditioner capable of preventing a reduction of the hot gas capacity and also preventing abrasion of a compressor caused by a decrease in quantities of refrigerant and oil in the hot gas cycle in the case where hot gas bypass operation is conducted for more than a predetermined period of time.

In the air conditioner of an aspect of the present invention, it is possible to conduct a normal cooling mode operation and a heating mode operation performed by a hot gas bypass in which a condenser is bypassed. Immediately before this heating mode operation, after cooling mode operation has been turned on for a predetermined period of time, it is turned off for a predetermined period of time, and then heating mode operation is started. Due to the foregoing, refrigerant residing in the condenser can be effectively recovered into the hot gas cycle in a short period of time. Therefore, it becomes possible to prevent the occurrence of abrasion or breakdown of parts of the compressor caused by lack of lubrication in the compressor.

In the air conditioner of another aspect of the present invention, a second decompression device for decompressing refrigerant discharged from a compressor is arranged in a hot gas bypass path, and the hot gas bypass path is connected with a portion between a first decompression device and an evaporator. Concerning the system constitution of the hot gas cycle, there are provided two types. One is a type in which one decompression device is used for both the cooling mode and the heating mode (type B). The other is a type in which two different decompression devices are used for both the cooling mode and the heating mode (type A). This aspect is limited to the constitution of the hot gas cycle system of type A. In this aspect, the same operation and effect as that of the above aspect can be provided.

In the air conditioner of the present invention, cooling mode operation conducted for a predetermined period of time immediately before the start of heating mode operation by the hot gas bypass may be turned on and off a plurality of times. Due to the foregoing, an operation conducted when a quantity of refrigerant in the hot gas cycle is small, can be reduced to as short as possible. Therefore, the occurrence of abrasion and breakdown of parts of the compressor caused by lack of lubrication can be further reduced.

In the air conditioner of the present invention, a predetermined period of time to turn on and off the cooling mode operation, which is conducted immediately before the start of heating mode operation by the hot gas bypass, can be determined by a quantity of refrigerant recovered from a condenser for each temperature of the outside air. The quantity of refrigerant recovered is changed according to the temperature of outside air when a compressor is operated. Accordingly, the recovery time to ensure a quantity of refrigerant necessary for the hot gas cycle is determined by the temperature of outside air.

In the air conditioner of the present invention, a predetermined period of time to turn on and off the cooling mode operation, which is conducted immediately before the start of heating mode operation by the hot gas bypass, can be determined by a difference in pressure between the high pressure side and the low pressure side. When the difference in pressure reaches a predetermined value, the compressor is turned off, so that refrigerant can be recovered by the difference in pressure. Compared with the recovery of refrigerant conducted according to the operation time of the compressor, this method is advantageous in that a state of operation can be positively detected and it becomes unnecessary to set a refrigerant recovery time which is necessary for each temperature of outside air.

In the air conditioner of the present invention, a predetermined period of time to turn on the cooling mode operation, which is conducted immediately before the start of heating mode operation by the hot gas bypass, can be determined by a rotary speed of an engine. As a quantity of refrigerant to be recovered is changed by a flow rate of refrigerant in the hot gas cycle, when the rotary speed of the engine is detected, it is possible to estimate the flow rate of refrigerant. Therefore, when the rotary speed of the engine, which represents the rotary speed of the compressor, is detected, the refrigerant recovery time is determined for each rotary speed.

In the air conditioner of the present invention, in the case where refrigerant recovery control is conducted after a heating mode operation conducted by the hot gas bypass has been continued for a predetermined period of time, when pressure in a condenser becomes higher than pressure on the low pressure side of the hot gas cycle by a predetermined pressure difference P1, refrigerant is recovered by the second OFF mode in which a compressor is turned off and the entry side of a condenser is opened. Due to the foregoing, refrigerant flows from the condenser into the hot gas cycle, and refrigerant can be recovered from the condenser.

In the air conditioner of the present invention, when an operation of the cooling mode is conducted for a predetermined period of time after the completion of operation of the heating mode, a state of a predetermined pressure difference P1 can be formed.

In the air conditioner of the present invention, after the completion of the heating mode, the first OFF mode, in which a compressor is turned off and the entry side of a condenser is opened, is conducted for a predetermined period of time, and then a cooling mode operation is conducted. In this way, a predetermined pressure difference P1 may be made. When the first OFF mode is conducted for a predetermined period of time before a cooling mode operation, after pressure in the condenser is once made to be equal to pressure on the low pressure side of the hot gas cycle, a predetermined pressure difference P1 can be made. Therefore, a period of time required for making the predetermined pressure difference P1 can be reduced, o. When the compressor is turned on, an operation is conducted while DUTY is set at a value higher than zero. In this variable displacement type compressor, it is possible to conduct a refrigerant recovery operation by the cooling mode in which DUTY to the compressor is gradually increased after a difference in pressure has been somewhat reduced. Therefore, the period of time of the first OFF mode can be reduced.

In the air conditioner of still another aspect of the present invention, in the case where a heating mode switch is turned off in heating mode operation and turned on again in a predetermined period of time, first, after the first OFF mode, in which a compressor is turned off and then the entry side of a condenser is opened, is conducted for a predetermined period of time, refrigerant is recovered by conducting a cooling mode operation. Due to the foregoing, no refrigerant is recovered under the condition that pressure in a condenser is lower than pressure on the low pressure side of the hot gas cycle. Accordingly, refrigerant can be effectively recovered.

The present invention may be more fully understood from the description of preferred embodiments of the invention, as set forth below, together with the accompanying drawings.

BRIEF DESCRIPTION OF THE DRAWINGS

In the drawings:

FIG. 14 is a flow chart of refrigerant recovery control after a hot gas bypass operation is conducted for a predetermined period of time by a variable displacement type compressor which is a sixth embodiment of the present invention.

DESCRIPTION OF THE PREFERRED EMBODIMENTS

Figure 1:
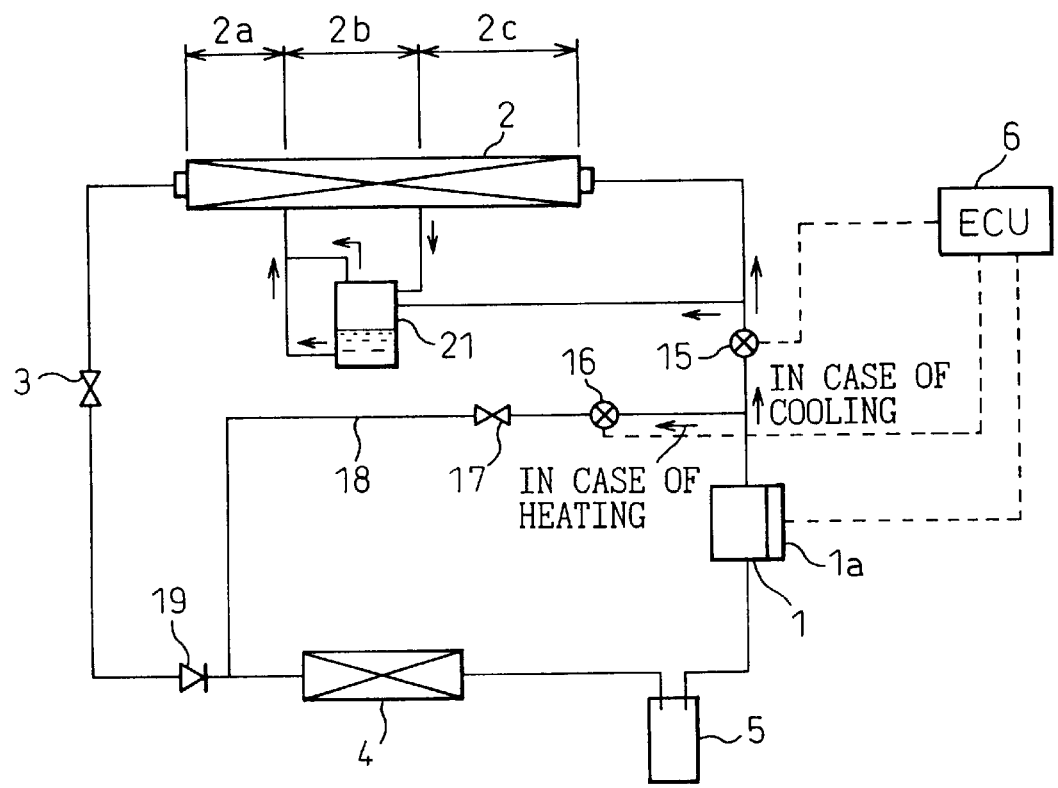
FIG. 1 is a system arrangement view of the air conditioner of the embodiment of the present invention.
Figure 2:
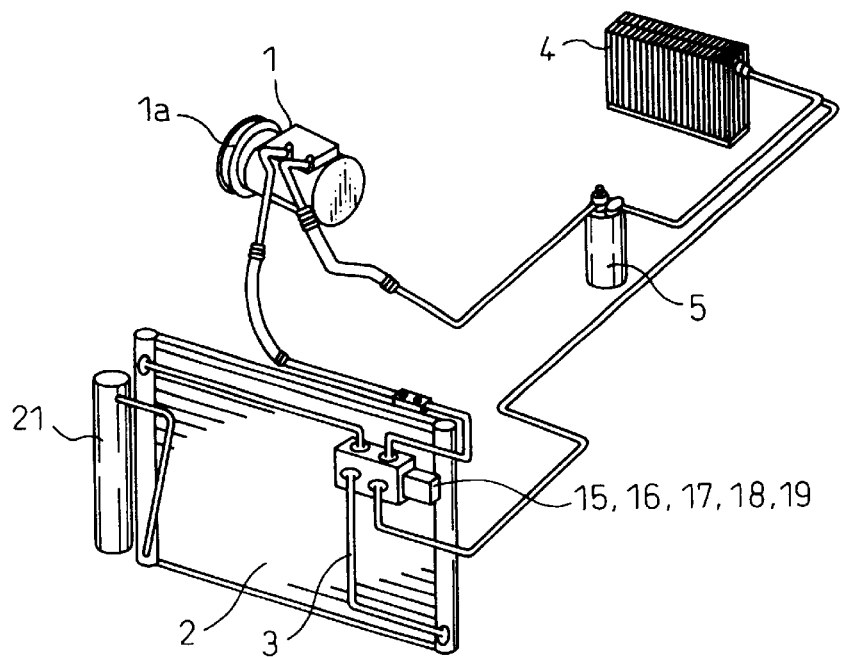
FIG. 2 is a schematic illustration showing a state in which the air conditioner of FIG. 1 is mounted on an actual car.

Referring to the drawings, an air conditioner of the embodiment of the present invention will be explained as follows. FIG. 1 is a system arrangement view of the air conditioner of the present invention. FIG. 2 is a schematic illustration showing the air conditioner mounted on an actual car. The compressor 1 is driven by a water cool type vehicle engine (not shown), for example, via the electromagnetic clutch 1a. The discharge side of the compressor 1 is connected with the condenser 2 via the cooling side changeover valve 15 which is a changeover valve means. This condenser 2 is composed in such a manner that the displacement of the condenser 2 can be controlled by three stages (2a, 2b, 2c) according to a cooling load, that is, this condenser 2 is composed in such a manner that a quantity of refrigerant can be adjusted according to a cooling load given to the air conditioner. The intermediate portion of the condenser 2 is connected with the receiver 21. Cooling air (outside air) is blown to the condenser 2 by an electric type cooling fan (not shown).

The delivery side of the condenser 2 is connected with the cooling side throttle 3 which is the first decompression device. The delivery side of this cooling side throttle 3 is connected with the evaporator 4 via the check valve 19. The delivery side of the evaporator 4 is connected with the suction side of the compressor 1 via the suction tank 5 which is a gas-liquid separator. In the suction tank 5, refrigerant is divided into gas and liquid, and the thus divided liquid refrigerant is stored in the suction tank 5, and gas refrigerant and a small quantity of liquid refrigerant in the bottom portion, into which oil is dissolved, are sucked onto the compressor 1 side.

On the other hand, between the discharge side of the compressor 1 and the entry side of the evaporator 4, there is provided a hot gas bypass path 18 to bypass the condenser 2 and others. In this bypass path 18, there are provided a heating side changeover valve 16, which is a changeover valve means, and a heating side throttle 17, which is the second decompressing means, and these heating side changeover valve 16 and the heating side throttle 17 are arranged in series. This throttle 17 can be composed of a fixed throttle such as an orifice or a capillary tube.

The evaporator 4 is arranged in an air conditioner case (not shown) arranged in a vehicle. The evaporator 4 cools air, which is blown by an electric type blower (not shown), in the cooling mode. In the heating mode adopted in winter, refrigerant gas of high temperature (hot gas) flows from the hot gas bypass path 18 into the evaporator 4, so that air can be heated. Therefore, the evaporator 4 functions as a radiator.

Usually, on the down stream side of the evaporator 4 in the air conditioner case, there is provided a warm water type heat exchanger (not shown) to heat air blown out by an electric blower while warm water (engine coolant) sent from a vehicle engine (not shown) is being used as a heat source. Conditioned air is blown out from an outlet arranged on the downstream side of the heat exchanger for heating to a passenger compartment.

The electronic control unit (ECU) 6 for air-conditioning is composed of a microcomputer and a peripheral circuits of the microcomputer. According to the previously set program, the electronic control unit 6 conducts calculation for signals inputted, so that the cooling side changeover valve 15 and the heating side changeover valve 16 can be opened and closed and other electric equipment can be operated. This electronic control unit 6 composes the control means of the present invention.

In FIG. 2 which is a schematic illustration showing the air conditioner mounted on an actual car, the cooling and heating side changeover valves 15, 16, hot gas bypass path 18, heating side throttle 17 and check valve 19 composing the system shown in FIG. 1 are integrated into one body. The cooling and heating side changeover valves 15, 16 are combined with one electromagnetic valve and differential pressure regulating valve.

Next, operation of the hot gas cycle of the air conditioner composed as described above will be explained below. The hot gas cycle of the air conditioner of the present invention is effective when a quantity of refrigerant in the hot gas cycle is insufficient and cooling operation for recovering refrigerant is conducted, for example, when the changeover valve is changed over for about 30 seconds.

In general, in the hot gas cycle system, the condenser section in the refrigerating cycle is bypassed, and operation is conducted in a region of outside air of low temperature different from the operation region of air conditioning (A/C). When the temperature of outside air is low, refrigerant and oil in the cycle tends to reside in a cool portion in the cycle which is a characteristic. Therefore, it can be thought that most of refrigerant and oil resides in the condenser, the volume of which is large, exposed to the temperature of outside air. Accordingly, it is necessary to recover refrigerant, which is residing in the condenser, from the condenser into the hot gas cycle in the case of hot gas operation. For example, at the start of a hot gas operation and in the case where hot gas operation is conducted for a predetermined period of time, it is necessary to recover refrigerant from the condenser.

However, in the case of recovering refrigerant, quantities of refrigerant and oil in the hot gas cycle are smaller than the appropriate values. When the compressor is operated under the above condition, durability of the compressor is greatly affected. According to the prior art, when a quantity of refrigerant is insufficient, the compressor is operated so that a necessary quantity of refrigerant can be recovered. Therefore, the compressor is operated in a severe condition from the viewpoint of durability.

According to the present invention, refrigerant is recovered by operating the compressor for a minimum period of time in a state, in which a quantity of refrigerant is insufficient, so that a necessary quantity of refrigerant can be recovered.

Figure 3:
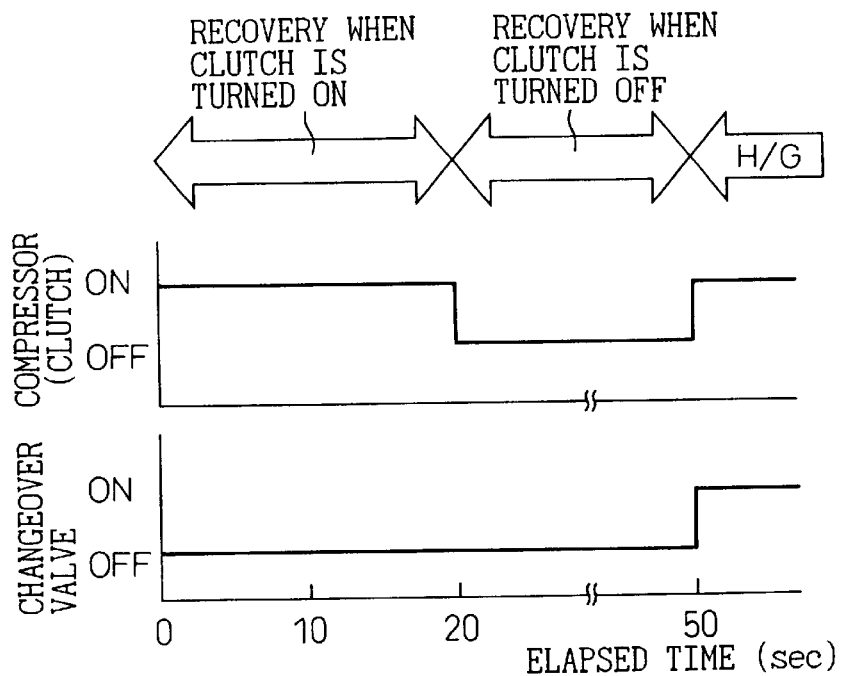
FIG. 3 is a time chart for explaining a state of refrigerant recovery operation which is a first embodiment of the present invention.

FIG. 3 is a time chart for explaining a state of operation of recovering refrigerant which is a first embodiment of the present invention. Before a hot gas operation is started, the cooling side changeover valve 15 is opened and the heating side changeover valve 16 is closed. The electromagnetic clutch 1a to connect the engine with the compressor 1 is turned on so as to drive the compressor 1, and cooling operation is conducted for a predetermined period of time, for example, for 20 seconds in the case shown in FIG. 3. By this cooling operation, a minimum quantity of refrigerant necessary for hot gas cycle operation (H/C) is recovered from the condenser 2. After that, while both the changeover valves 15, 16 are set in the cooling mode, the electromagnetic clutch 1a is turned off so as to stop driving the compressor 1. The compressor is turned off for a predetermined period of time. In the case shown in FIG. 3, the compressor is turned off for 30 seconds. By a difference in pressure between the high pressure side of the condenser 2 and the low pressure side of the evaporator 4 in the cycle, a quantity of refrigerant, which is sufficient for hot gas operation (H/G), is recovered, for example, refrigerant of 200 g is recovered in which consideration is given to a quantity of refrigerant leaking from the changeover valve in hot gas operation.

On the other hand, according to the prior art, refrigerant is recovered while the compressor is being driven. Immediately after that, hot gas operation is conducted. When operation is conducted as described above, the compressor must be operated for a long period of time under a severe condition that a quantity of refrigerant gas is insufficient. As a hot gas operation is started, and pressure on the suction side of the compressor is gradually increased, a quantity of refrigerant capable of being recovered from the condenser by the pressure difference is small. Therefore, when the compressor is turned off for a predetermined period of time after refrigerant has been recovered in the cooling mode, a necessary quantity of refrigerant can be recovered in shorter period of time of compressor operation than that of the prior art.

Figure 4:
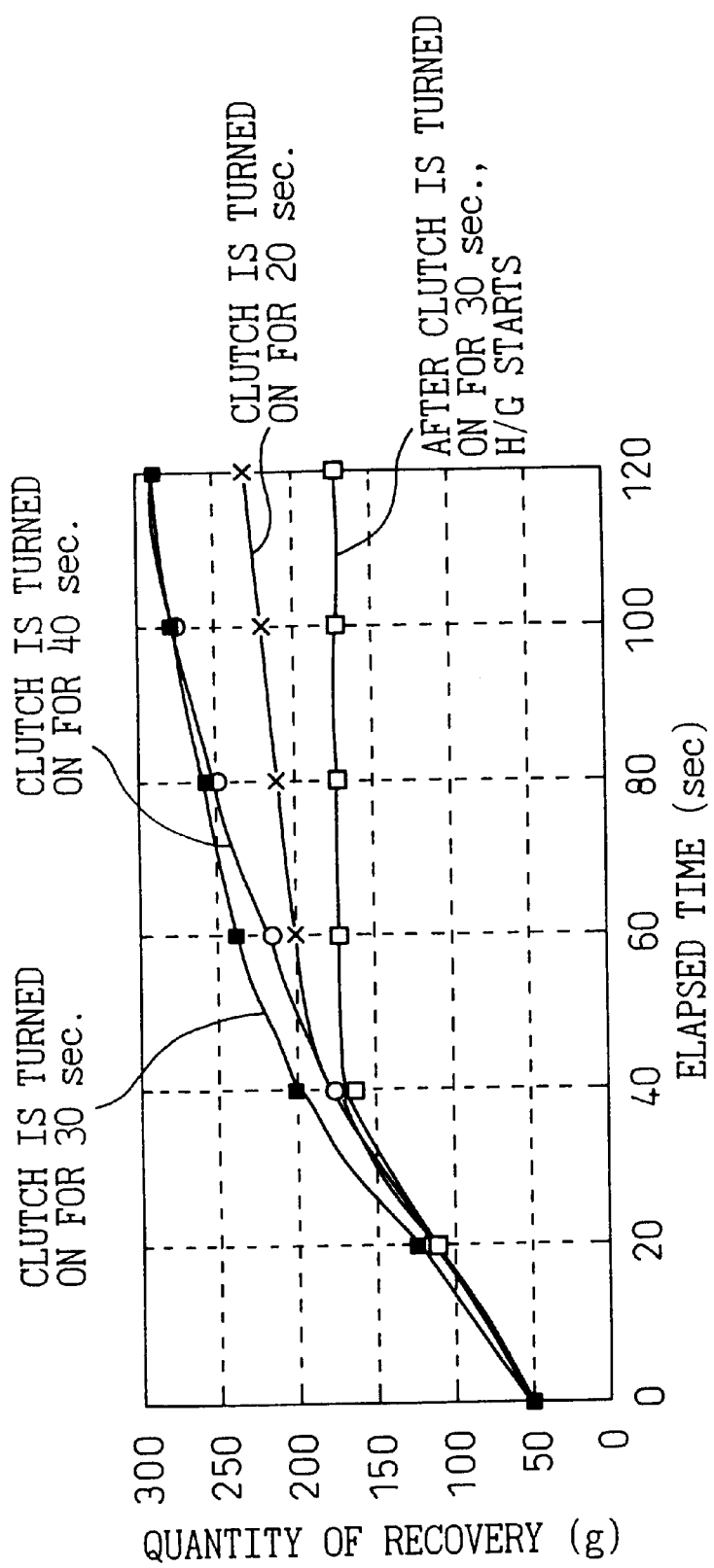
FIG. 4 is a graph showing a relation between the lapse of time (s) and the quantity of recovery (g) at the outside air temperature −10° C. in the present invention and also showing a relation between the lapse of time (s) and the quantity of recovery (g) of the prior art.

FIG. 4 is a graph showing an evaluation result of comparison between the present invention and the prior art, wherein the evaluation is made when the temperature of the outside air is −10° C.

In FIG. 4, a quantity of refrigerant (g) recovered from the condenser and a lapse of time (s) are shown in the case where a period of operation time of the compressor in the cooling mode to recover refrigerant is changed and then the compressor is turned off and both changeover valves are left in the cooling mode. A curve plotted by black square marks shows a case in which the compressor is operated for 30 seconds in the cooling mode and then the compressor is stopped while the cooling mode is kept as it is. A curve plotted by circular marks shows a case in which the compressor is operated for 40 seconds in the cooling mode and then the compressor is stopped while the cooling mode is kept as it is. A curve plotted by marks x shows a case in which the compressor is operated for 20 seconds in the cooling mode and then the compressor is stopped while the cooling mode is kept as it is. Further, a curve plotted by white square marks shows a case in which the compressor is operated for 30 seconds in the cooling mode in the same manner as that of the prior art and immediately after that, the operation mode is changed to the heating mode so as to conduct hot gas operation (H/G).

As can be seen in the graph of FIG. 4, in order to recover refrigerant by 200 g when the temperature of outside air is −10° C., it is necessary that the compressor is operated for 20 seconds in the cooling mode and then stopped for 30 seconds, that is, the clutch is turned off for 30 seconds.

On the other hand, when the compressor is operated for 30 seconds for recovering refrigerant and hot gas operation is conducted in the heating mode immediately after that according to the prior art, a quantity of refrigerant recovered from the condenser is approximately 170 g, from which the quantity of refrigerant recovered is not increased even when the lapse of time increases. The reason is that when hot gas operation is conducted, pressure on the low pressure side (the evaporator 4 and the suction tank 5) is increased higher than pressure in the condenser 2, and a difference in pressure between the high pressure side and the low pressure side can not be made.

A quantity of refrigerant recovered when the compressor is operated changes according to the temperature of outside air. The reason is that an increase in pressure on the high pressure side (condenser) relies on the temperature of outside air.

Figure 5:
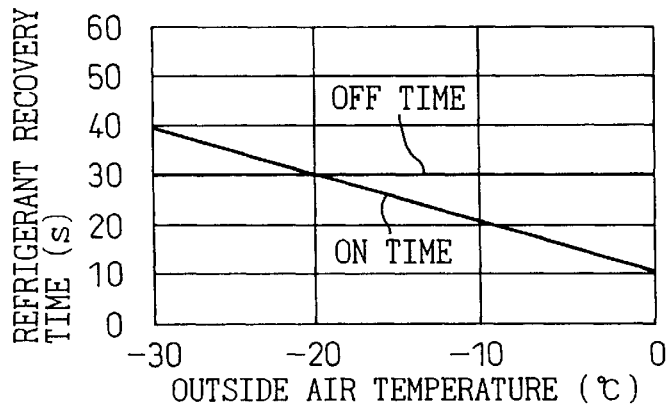
FIG. 5 is a graph showing ON time and OFF time of a compressor by a relation between the outside air temperature (° C.) and the refrigerant recovery time (s)

FIG. 5 is a graph in which the compressor operation time (ON time) and the compressor stop time (OFF time) are shown by a relation between the temperature (° C.) of outside air and the refrigerant recovery time (s). From this graph, a period of recovery time to ensure a quantity of refrigerant necessary for hot gas operation may be determined. For example, when the temperature of outside air is −30° C., operation time (ON time) of the compressor is set at 40 seconds, and stoppage time (OFF time) of the compressor is set at 30 seconds. In this connection, OFF time of the compressor is always set at 30 seconds irrespective of the temperature of outside air.

As described above, when the residing refrigerant is recovered from the condenser, the compressor is operated for a predetermined period of time in the cooling mode, and then OFF (stoppage) time of the compressor is provided while the operation mode is kept in the cooling mode. Due to the foregoing, operation of the compressor, which is driven while a quantity of refrigerant is insufficient, can be reduced. Compared with a case in which hot gas operation is made immediately after the completion of refrigerant recovery operation, it is possible to recover a larger quantity of refrigerant when OFF time is provided in operation of the compressor.

In this connection, the aforementioned refrigerant recovery operation is carried out by output signals outputted from ECU 6 according to the input signals sent from the outside temperature sensor.

Figure 6:
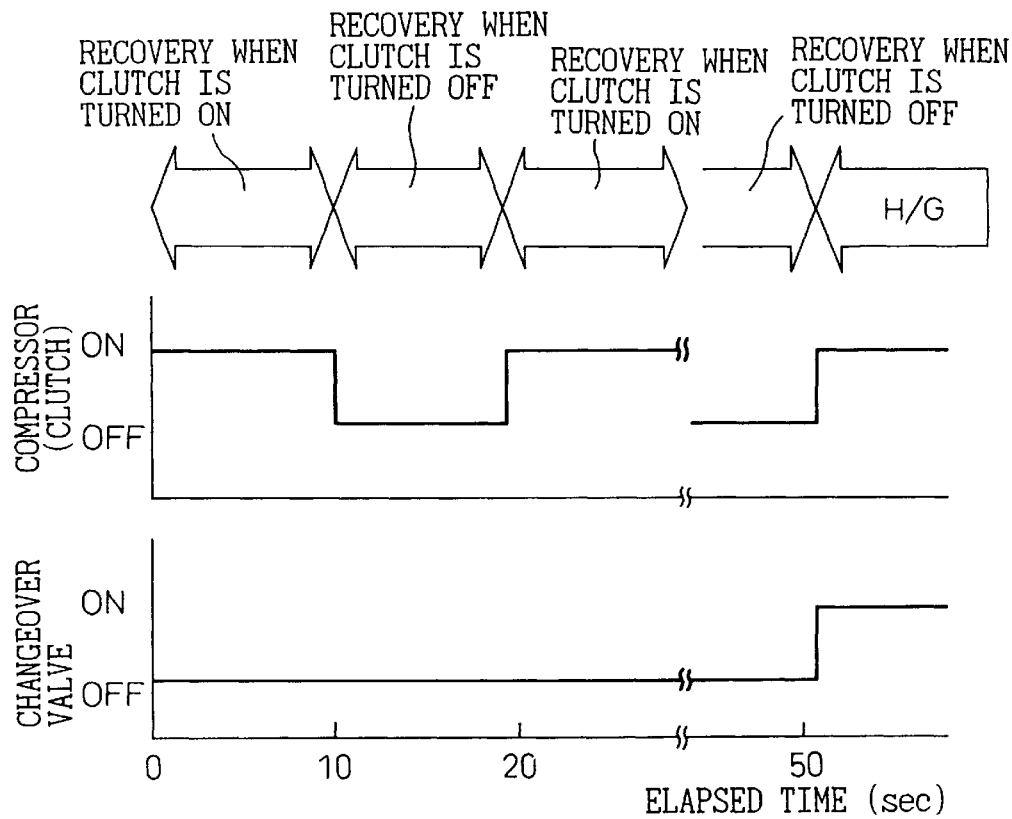
FIG. 6 is a time chart for explaining a state of refrigerant recovery operation which is a second embodiment of the present invention.

FIG. 6 is a time chart for explaining a state of refrigerant recovery operation which is a second embodiment of the present invention. In this refrigerant recovery operation conducted before operation of the heating mode by hot gas, the compressor is turned on and off by a plurality of times in the cooling mode, so that refrigerant can be recovered. In FIG. 6, after the compressor is driven for 10 seconds in the cooling mode, the compressor is stopped for 10 seconds. Next, after the compressor is driven again, the compressor is stopped again. After the compressor has been turned on and off in this way for 50 seconds, the compressor is driven in the heating mode and hot gas (H/G) operation is conducted.

In the refrigerant recovery operation conducted in the cooling mode, the compressor is operated in the case cycle. Therefore, in the second embodiment, the compressor is intermittently driven when refrigerant is recovered as shown in FIG. 6, so that operation of the compressor can be reduced when a quantity of refrigerant is small in the hot gas cycle.

Figure 7:
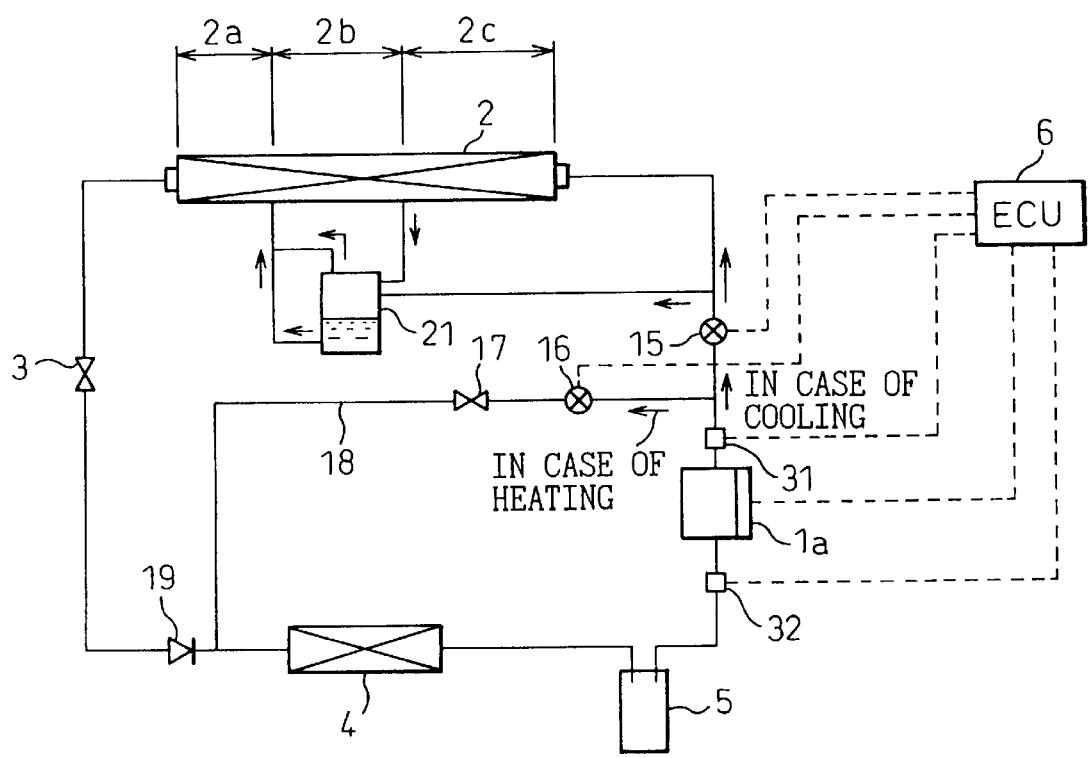
FIG. 7 is a system arrangement view of the air conditioner of a third embodiment of the present invention.

FIG. 7 is a view showing a third embodiment of the present invention. In the system arrangement of the air conditioner of this third embodiment, on the discharge side (high pressure side) of the compressor 1, there is provided a first pressure detecting device (pressure sensor) 31. On the low pressure side (in the region after decompression) of the hot gas cycle, which is the suction side of the compressor 1, there is provided a second pressure detecting device (pressure sensor) 32. Other points of the arrangement are the same as those of the embodiments described before.

In this third embodiment, the compressor 1 is not driven according to the time when refrigerant is recovered, which is unlike the above embodiments. In this embodiment, the compressor 1 is stopped (OFF) when a difference in pressure between pressure detected by the first pressure detecting device 31 on the discharge side of the compressor 1 and pressure detected by the second pressure detecting device 32 on the suction side of the compressor 1 becomes a predetermined value, and refrigerant is recovered by the difference in pressure in the cycle. In this connection, even in this case, signals of the pressure sensors 31, 32 are inputted into ECU 6, and the compressor 1 (electromagnetic clutch) is turned on and off according to the output from ECU 6.

Compared with refrigerant recovery which is made according to the operation time of the compressor as described in the first and the second embodiment, in this third embodiment, a state of operation (pressure on the discharge and the suction side of the compressor) can be appropriately detected, and further it becomes unnecessary to set the refrigerant recovery time which is necessary at each outside air temperature in the first and the second embodiment. When a difference in pressure in the case of stoppage (OFF) of the compressor is detected, it is possible to determine the stoppage time (OFF time) of the compressor by this difference in pressure.

Figure 8:
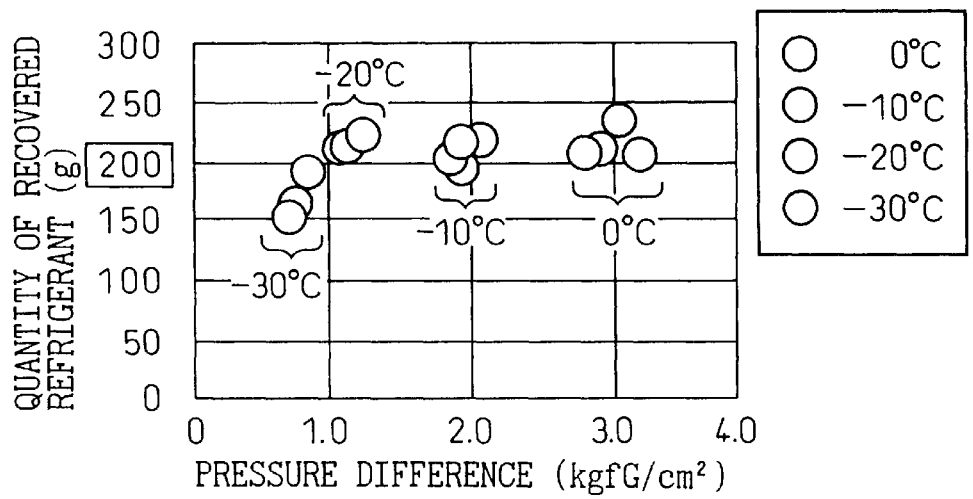
FIG. 8 is a graph showing a relation between a pressure difference (kgfG/cm$^2$), between discharge and suction of a compressor, and a quantity of recovered refrigerant (g) for each outside air temperature.

FIG. 8 is a graph showing a relation between the difference in pressure (kgfG/cm$^2$) on the discharge side and the suction side of the compressor and the quantity of refrigerant (g) for each temperature of outside air. From this graph, it can be seen that, in order to obtain a predetermined quantity of refrigerant, for example, in order to obtain refrigerant of 200 g, a predetermined difference in pressure is required for each temperature of outside air. Accordingly, operation may be made as follows. A predetermined difference in pressure is set by the temperature of outside air according to FIG. 8, and the compressor is driven until this difference in pressure is obtained. Next, the compressor is stopped until the difference in pressure between the high pressure side and the low pressure side becomes a value not more than 0.5 kgfG/cm$^2$, and refrigerant is recovered according to the difference in pressure.

Figure 9:
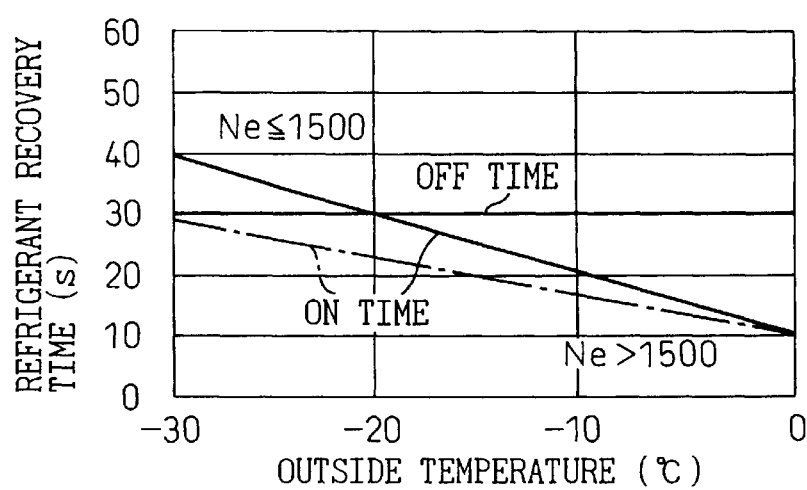
FIG. 9 is a graph showing a relation between the outside air temperature (° C.) and the refrigerant recovery time (s), wherein a rotary speed Ne of an engine is divided at 1500 rpm.

FIG. 9 is a graph showing a relation between the temperature (° C.) of outside air and the refrigerant recovery time (s) in the case where rotary speed Ne of the engine is different. As a quantity of recovered refrigerant is changed by a flow rate of refrigerant in the cycle, it is possible to estimate the flow rate by detecting the rotary speed of the compressor.

In a fourth embodiment of the present invention, a value to indicate a rotary speed of the engine is detected, for example, rotary speed Ne of the engine is detected, and the refrigerant recovery time is determined for each rotary speed of the engine. For example, as shown in FIG. 9, the rotary speed Ne of the engine is divided at 1500 rpm, and the refrigerant recovery time is determined. When the temperature of outside air is −20° C. and rotary speed Ne of the engine is higher than 1500 rpm, as shown by one-dotted chain line in FIG. 9, the operation time (ON time) of the compressor to recover refrigerant in the cooling mode is approximately 23 seconds, and the stoppage time (OFF time) of the compressor is 30 seconds. In this connection, the OFF time is 30 seconds at all times irrespective of the temperature of outside air and rotary speed of the engine.

Figure 10:
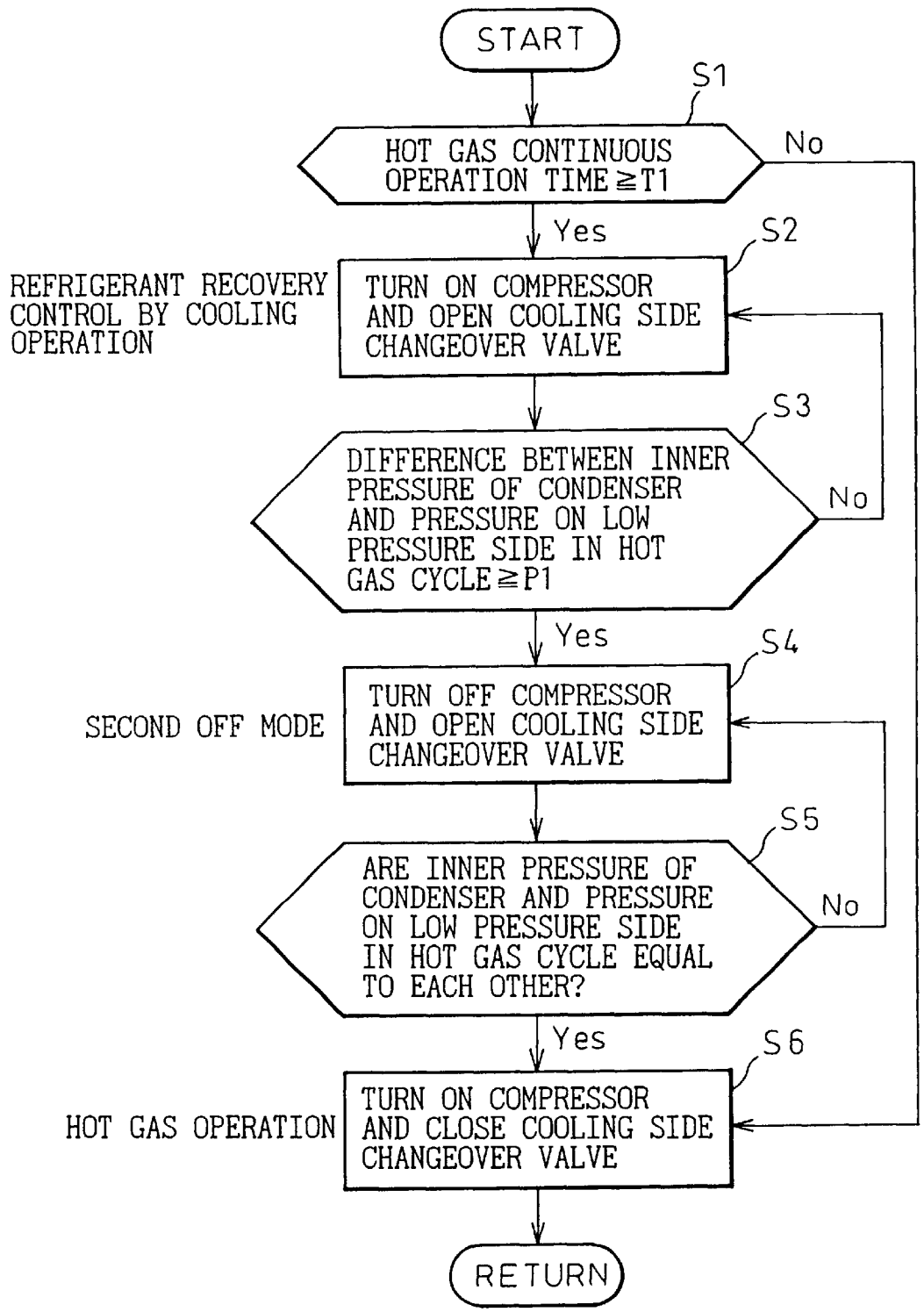
FIG. 10 is a flow chart of refrigerant recovery control after hot gas bypass control is conducted for a predetermined period of time which is a fourth embodiment of the present invention.

FIG. 10 is a flow chart showing refrigerant recovery control conducted after hot gas bypass operation (heating mode operation) has been conducted for a predetermined period of time which is the fourth embodiment of the present invention.

In the conventional case, there is a possibility that refrigerant leaks from the cooling side changeover valve 15 to the condenser 2 in the case where hot gas bypass operation is conducted for a predetermined period of time. In this case, quantities of refrigerant and oil in the hot gas cycle are decreased, and the capacity of hot gas operation is lowered and further the compressor 1 might be worn away due to a decrease in the quantity of circulated oil. Therefore, when a hot gas bypass operation (heating mode operation) is conducted for not less than a predetermined period of time, it is necessary to recover refrigerant residing in the condenser 2. Accordingly, for example, after predetermined period of time T1 (about 30 minutes) has passed, it is necessary to conduct a refrigerant recovery operation.

In the air conditioner of the present invention, this refrigerant recovery operation is conducted according to the refrigerant recovery control flow chart shown in FIG. 10. This refrigerant recovery control is made by ECU 6 which is a refrigerant recovery control means. In this case, although not shown in the drawing, the condenser inner pressure sensor and the hot gas cycle low pressure side pressure sensor are provided, and pieces of pressure information obtained by these pressure sensors are inputted into ECU 6, so that the electromagnetic clutch 1a and both the changeover valves 15, 16 are controlled. In step S1, it is judged whether or not the hot gas bypass continuous operation time is not less than predetermined period of time T1, that is, it is judged whether or not the hot gas bypass continuous operation time is not less than 30 minutes. In the case of YES, the program proceeds to the next step S2. In the case of NO, hot gas bypass operation is further continued. In step S2, the compressor is turned on and the cooling side changeover valve 16 is opened, which is refrigerant recovery control of cooling operation. Specifically, the electromagnetic clutch 1a is turned on, so that the compressor 1 is turned on, and both the heating side changeover valve 15 and the cooling side changeover valve 16 are opened so as to conduct cooling operation. Due to the foregoing, it is judged whether or not a difference in pressure between the inner pressure of the condenser 2 and the pressure on the low pressure side of the hot gas cycle becomes a value not less than predetermined pressure difference P1 (step S3). In the case of YES, the program proceeds to step S4. In the case of NO, cooling operation is continued.

In step S4, the compressor is turned off and the cooling side changeover valve 16 is opened, which is the second mode. Specifically, the electromagnetic clutch 1a is turned off, the compressor 1 is turned off, and both the heating side changeover valve 15 and the cooling side changeover valve 16 are kept open.

Next, in step S5, it is judged whether or not the inner pressure of the condenser 2 and the pressure on the low pressure side of the hot gas cycle become equal to each other. In the case of YES, the program proceeds to step S6, and the compressor is turned on and the cooling side changeover valve 16 is closed, which is a hot gas bypass operation.

Specifically, the electromagnetic clutch 1a is turned on, the compressor 1 is turned on, the cooling side changeover valve 16 is closed, and the heating side changeover valve 15 is kept open. Due to the foregoing, hot gas bypass operation is started again. In the case of NO, the program returns to step S4, and the compressor 1 is kept turned off.

Figure 11:
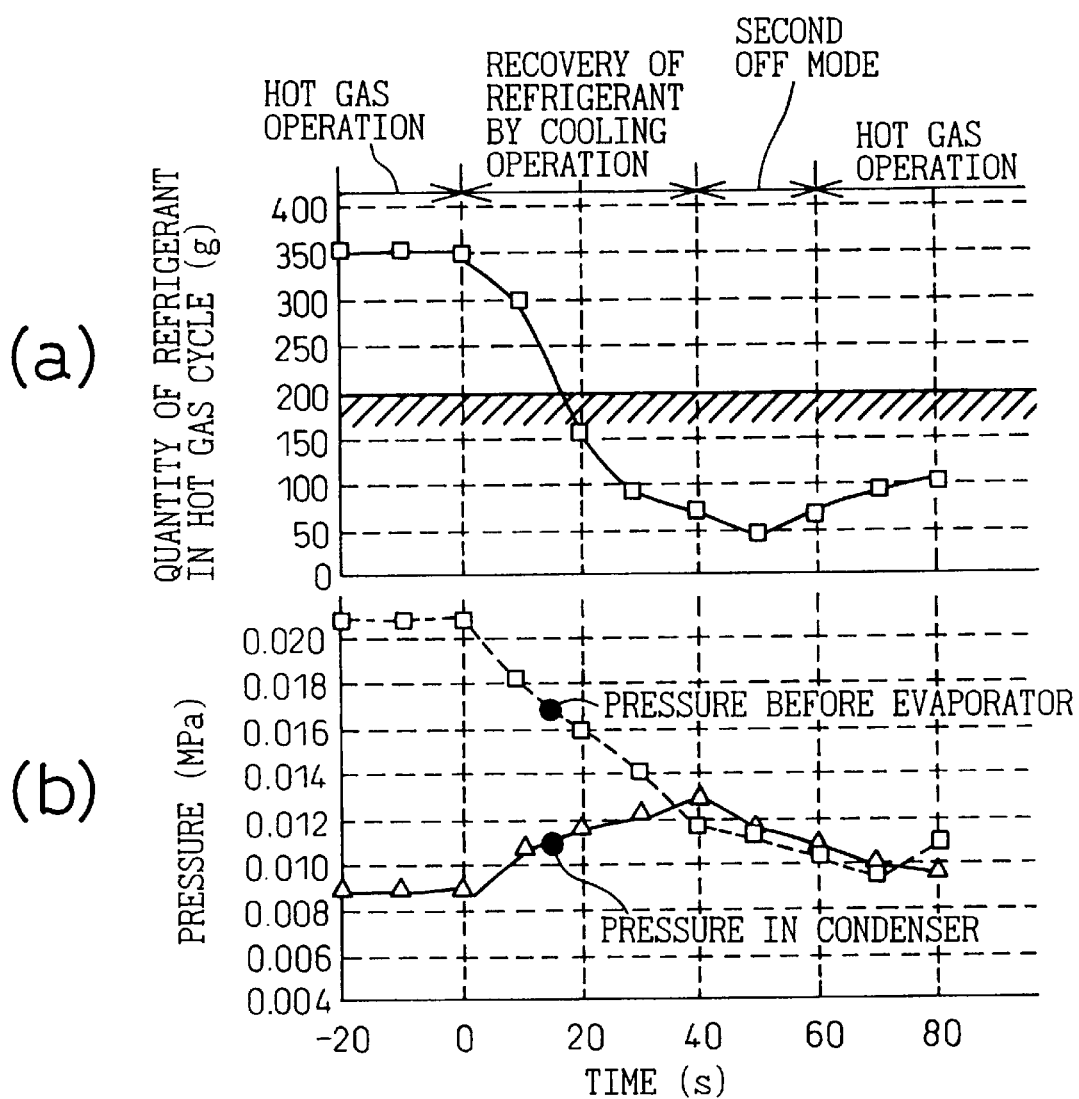
FIG. 11 is a graph showing a time chart in which item (a) is a time chart showing a quantity of refrigerant in the hot gas cycle and item (b) is a time chart showing pressure before an evaporator and also showing pressure in a condenser in the case where refrigerant recovery control of the fourth embodiment is conducted.

In FIG. 11, item (a) is graph showing a change in the quantity of refrigerant in the hot gas cycle with respect to the time in the case where refrigerant recovery control of the fourth embodiment shown in FIG. 10 is conducted, and item (b) is a graph showing a change in the pressure before the evaporator (pressure on the low pressure side in the hot gas cycle) with respect to the time and also showing a change in the pressure in the condenser with respect to the time. In hot gas bypass operation, as shown in FIG. 11, the pressure on the low pressure side in the hot gas cycle is usually higher than the pressure in the condenser 2. Therefore, as shown in FIG. 11, when hot gas bypass operation is immediately changed to refrigerant recovery operation conducted by the cooling mode, refrigerant flows immediately into the condenser 2, the pressure in which is low. Therefore, it is necessary to continue refrigerant recovery operation conducted by the cooling mode until the pressure in the condenser 2 is increased to a value higher than the pressure on the low pressure side in the hot gas cycle (pressure before the evaporation).

The condition in which refrigerant flows from the condenser 2 into the hot gas cycle is that the pressure in the condenser 2 is higher than the pressure on the low pressure side in the hot gas cycle. The condition in which refrigerant flows from the hot gas cycle into the condenser 2 is that the pressure in the condenser 2 is lower than the pressure on the low pressure side in the hot gas cycle and the cooling side changeover valve 15 is opened or the valve closing force of the valve 15 is weak.

After a refrigerant recovery operation has been conduced in the cooling mode as described above, operation is conducted by the second OFF mode as shown in FIGS. 10 and 11. Due to the above operation conducted by the second OFF mode, the inner pressure of the condenser 2 is gradually made to be equal to the pressure on the low pressure side in the hot gas cycle, and refrigerant gradually flows into the hot gas cycle by a difference in pressure.

When hot gas bypass operation is conducted immediately after the completion of refrigerant recovery operation by the cooling mode, as an increase in the pressure on the low pressure side of the hot gas cycle is fast, a period of time in which the pressure in the condenser 2 is higher than the pressure on the low pressure side in the hot gas cycle becomes short. As a result, a quantity of refrigerant capable of being recovered from the condenser 2 is decreased.

After operation has been conducted by the second OFF mode, hot gas bypass operation is started again. Due to the foregoing, a quantity of refrigerant in the hot gas cycle is gradually increased.

In the fourth embodiment of the present invention shown in FIGS. 10 and 11, as it takes long time for the pressure in the condenser 2 to be increased higher than the pressure on the low pressure side in the hot gas cycle and as the pressure in the condenser 2 is not increased higher than the pressure on the low pressure side in the hot gas cycle when refrigerant recovery operation is conducted by the cooling mode in a short period of time, it becomes impossible to recover refrigerant from the condenser 2.

Figure 12:
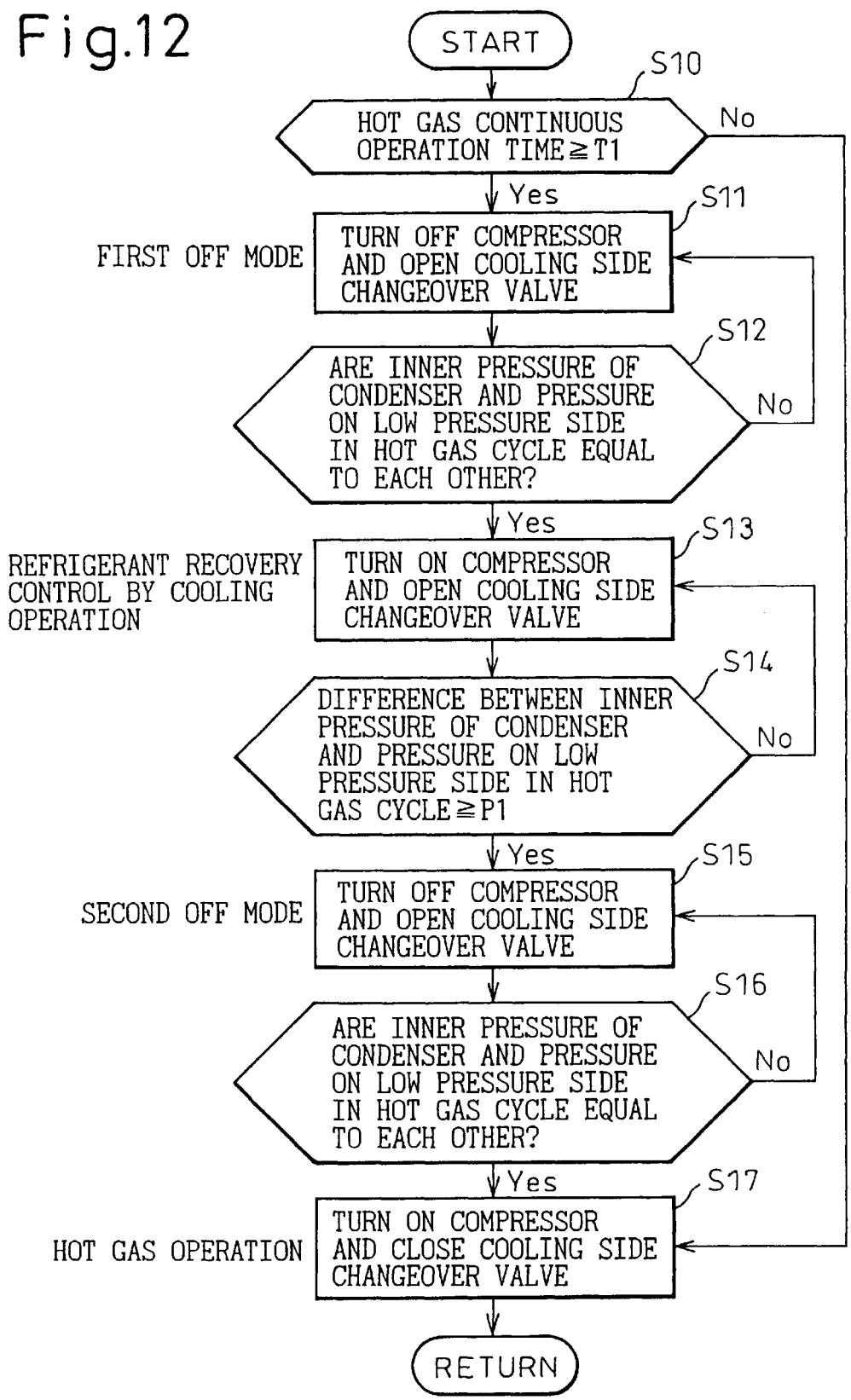
FIG. 12 is a flow chart showing refrigerant recovery control after hot bypass operation is conducted for a predetermined period of time which is a fifth embodiment of the present invention.
Figure 13:
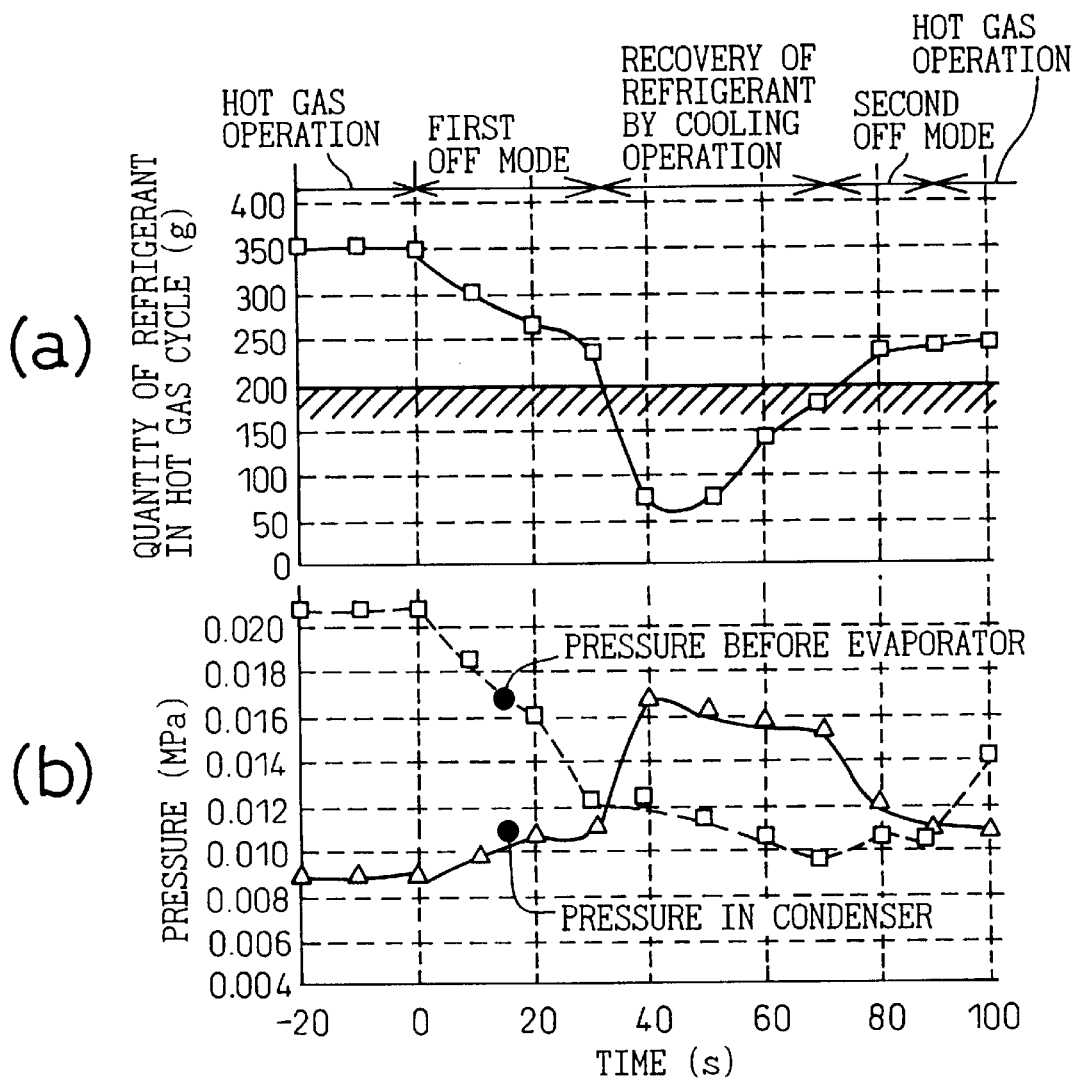
FIG. 13 is a graph showing a time chart in which item (a) is a time chart showing a quantity of refrigerant in the hot gas cycle and item (b) is a time chart showing pressure before an evaporator and also showing pressure in a condenser in the case where refrigerant recovery control of the fifth embodiment is conducted.

In order to solve the above problems, in a fifth embodiment of the present invention, operation conducted by the first OFF mode is added before refrigerant recovery operation conducted by the cooling mode. FIG. 12 is a flow chart showing refrigerant recovery control conducted after hot gas bypass operation has been conducted for a predetermined period of time in the fifth embodiment of the present invention. In FIG. 13, item (a) is a graph showing a change in the quantity of refrigerant in the hot gas cycle with respect to the time in the case where refrigerant recovery control of the fifth embodiment is conducted, and item (b) is a graph showing a change in the pressure before the evaporator (pressure on the low pressure side in the hot gas cycle) with respect to the time and also showing a change in the pressure in the condenser with respect to the time.

In the flow chart shown in FIG. 13, first, in step S10, it is judged whether or not the hot gas bypass continuous operation time is not less than T1 and, for example, it is judged whether or not the hot gas bypass continuous operation time is not less than 30 minutes. In the case of YES, the program proceeds to step S11. In the case of NO, hot gas bypass operation is continued as it is.

In step S11, the compressor is turned off and the cooling side changeover valve 15 is opened which is the first OFF mode. Specifically, the electromagnetic clutch 1a is turned off, so that the compressor 1 is turned off. Further, both the cooling side changeover valve 15 and the heating side changeover valve 16 are opened. Next, in step S12, it is judged whether or not the pressure in the condenser 2 and the pressure on the low pressure side in the hot gas cycle (pressure before the evaporator) are equal to each other. In the case of YES, the program proceeds to step S13. In the case of NO, the state is continued as it is.

In step S13, refrigerant recovery control is conducted by cooling operation. Specifically, the electromagnetic clutch 1a is turned on, so that the compressor 1 is turned on, and the cooling side changeover valve 15 is opened. In this connection, the heating side changeover valve 16 is kept open. Next, in step S14, the pressure in the condenser 2 is increased. It is judged whether or not the pressure in the condenser 2 is increased higher than the pressure on the low pressure side of the hot gas cycle by predetermined value P1. In the case of YES, the program proceeds to the next step S15. In the case of NO, cooling operation is continued as it is.

In step S15, the compressor 1 is turned off and the cooling side changeover valve 15 is opened, which is the second OFF mode. Specifically, the electromagnetic clutch 1a is turned off and the compressor 1 is turned off, and the cooling side changeover valve 15 and the heating side changeover valve 16 are kept open. In step S16, the pressure in the condenser 2 is gradually decreased, and it is judged whether or not the pressure in the condenser 2 becomes equal to the pressure on the low pressure side in the hot gas cycle. In the case of YES, the program proceeds to step S17, and hot gas bypass operation is started. Specifically, the electromagnetic clutch 1a is turned on and the compressor 1 is turned on, and the cooling side changeover valve 15 is closed. Of course, the heating side changeover valve 16 is kept open. In the case of NO, the second OFF mode continues.

In the fifth embodiment, as shown in FIG. 13, the first OFF mode is made by conducting hot gas bypass operation. Then, the pressure in the condenser 1 is made to be equal to the pressure on the low pressure side in the hot gas cycle, and refrigerant recovery operation is conducted in the cooling mode. In this way, refrigerant can be effectively recovered from the condenser 2 as in refrigerant recovery control conducted at the start of operation. The reason why refrigerant can be effectively recovered from the condenser 2 is thought to be as follows. Although refrigerant gradually flows into the condenser 2 because the first OFF mode is made in hot gas bypass operation, a quantity of refrigerant flowing into the condenser 2 is small compared with the second OFF made in the fourth embodiment.

As can be seen in FIG. 13, in hot gas bypass operation, a quantity of refrigerant in the hot gas cycle tends to increase. In the first OFF mode, the quantity of refrigerant in the hot gas cycle tends to gradually decrease. In refrigerant recovery control conducted by cooling operation, the quantity of refrigerant quickly decreases. In the second OFF mode, the quantity of refrigerant tends to increase.

In the same manner, as can be seen in FIG. 13, in hot gas bypass operation, the pressure (pressure before the evaporator) on the low pressure side in the hot gas cycle tends to increase. On the other hand, the pressure in the condenser 2 tends to decrease. Therefore, the pressure difference is maximized. When the mode changes into the first OFF mode in this state, the pressure on the low pressure side in the hot gas cycle decreases and the pressure in the condenser increases, so that the pressure on the low pressure side in the hot gas cycle becomes equal to the pressure in the condenser. When cooling operation is conducted in this state, the pressure in the condenser increases to be higher than the pressure on the low pressure side in the hot gas cycle. When the mode changes into the second OFF mode, the pressure on the low pressure side in the hot gas cycle becomes equal to the pressure in the condenser. Next, when hot gas bypass operation is started again, a difference between the pressure on the low pressure side in the hot gas cycle and the pressure in the condenser gradually increases.

In the fifth embodiment described above, the first OFF mode is added to the fourth embodiment, and the program waits until the pressure in the condenser and the pressure on the low pressure side in the hot gas cycle become equal to each other. However, in the case of a variable displacement type compressor, it is possible to operate in such a manner that recovery control in the case of using a variable displacement type compressor, which is a sixth embodiment of the present invention. This flow chart is essentially the same as that of the fifth embodiment. However, in this embodiment, in the first OFF mode in step S21 and in the second OFF mode in step S25, the compressor is turned off when DUTY of the compressor is made to be zero. In refrigerant recovery control conducted by cooling operation in step S23 and in hot gas bypass operation in step S27, the compressor is turned on when DUTY of the compressor is increased to be higher than zero. In the fifth embodiment, it is judged in step S12 whether or not the pressure in the condenser and the pressure on the low pressure side in the hot gas cycle become equal to each other. However, in the sixth embodiment, it is judged in step S22 whether or not a difference between the pressure in the condenser and the pressure on the low pressure side in the hot gas cycle becomes a value not more than predetermined value P2 in the first OFF mode. In this way, it may not be judged whether or not both of them become equal to each other but it may be judged whether or not the difference between them becomes a value not more than predetermined value P2. Therefore, it is possible to shorten a period of time of the first OFF mode. Other steps S20, S24 and S26 are the same as steps S10, S14 and S16 of the fifth embodiment.

Except for the embodiments described above, when a hot gas operation switch (heating mode switch) is turned off, for some reason in the process of hot gas bypass operation and the switch is turned on again, refrigerant recovery operation is conducted after the first OFF mode operation has been conducted. The reason why the above operation is conducted is as follows. When refrigerant recovery control is suddenly started by conducting cooling operation within several seconds immediately after the hot gas operation switch has been turned off without setting the first OFF mode, as the pressure in the condenser is lower than the low pressure side in the hot gas cycle, it is impossible to sufficiently recover refrigerant.

The above explanations are made into a hot gas cycle system of the case (type A) in which the first decompression device 3 is used in the cooling mode and the second decompression device 17 is used in the heating mode. However, it is well known to adopt a hot gas cycle system of the case (type B) in which one decompression device is used and both the cooling mode and the heating mode use this one decompression device. The present invention can be applied to an air conditioner having the above type B hot gas cycle system. Even when the present invention is applied to the air conditioner having the above type-B hot gas cycle system, the same effect as that of the air conditioner having the above type-A hot gas cycle system can be provided.

As explained above, the present invention can provide the following effects. A quantity of refrigerant necessary for the hot gas cycle can be ensured by operating the compressor in the minimum period of time. Therefore, a period of time in which the compressor is driven under the condition that quantities of refrigerant and oil are small, can be reduced to as short as possible. Accordingly, it is possible to prevent abrasion or breakdown of parts of the compressor caused by failure in lubrication inside the compressor. As the OFF time of the compressor is provided in refrigerant recovery operation, a difference in pressure in the cycle can be effectively utilized, and refrigerant can be effectively recovered.

While the invention has been described by reference to specific embodiments chosen for purposes of illustration, it should be apparent that numerous modifications could be made thereto by those skilled in the art without departing from the basic concept and scope of the invention.

What is claimed is:

1. An air conditioner comprising:
   a compressor for compressing and discharging refrigerant;

a condenser for condensing refrigerant discharged from the compressor;

a first decompression device for decompressing refrigerant condensed by the condenser;

an evaporator for evaporating refrigerant decompressed by the first decompression device;

a hot gas bypass path for directly connecting a discharge side of the compressor with an entry side of the evaporator; and valve means for changing over communication between the discharge side of the compressor and the entry side of the condenser and also changing over communication between the discharge side of the compressor and the entry side of the hot gas bypass path, wherein the valve means opens the entry side of the condenser and closes the entry side of the hot gas bypass path so as to conduct a normal cooling mode operation, and the valve means closes the entry side of the condenser and opens the entry side of the hot gas bypass path so as to conduct a heating mode operation by the hot gas bypass path, the air conditioner further comprising:

all refrigerant recovery control means for recovering refrigerant before the start of the heating mode conducted by the hot gas bypass and after the normal cooling mode operation is turned on for a first predetermined period of time, wherein the normal cooling mode operation is turned off for a second predetermined period of time before the heating mode operation is conducted.

2. An air conditioner according to claim 1, wherein a second decompression device for decompressing refrigerant gas discharged from the compressor is arranged in the hot gas bypass path, and the hot gas bypass path is connected with a portion between the first decompression device and the evaporator.

3. An air conditioner according to claim 1, wherein the normal cooling mode operation conducted for the first predetermined period of time repeatedly turns the compressor on and off a plurality of times.

4. An air conditioner according to claim 1, wherein the first and second predetermined periods of time are determined by a quantity of refrigerant recovered from the condenser for each temperature of outside air.

5. An air conditioner according to claim 1, wherein the first and second predetermined periods of time are determined by a difference in pressure between the high pressure side of the compressor and the low pressure side.

6. An air conditioner according to claim 1, wherein the first predetermined period of time is determined by a rotary speed of the engine.

* * * * *

UNITED STATES PATENT AND TRADEMARK OFFICE
CERTIFICATE OF CORRECTION

PATENT NO.    : 6,748,753 B2
DATED         : June 15, 2004
INVENTOR(S)   : Yoshiaki Takano et al.

Page 1 of 1

It is certified that error appears in the above-identified patent and that said Letters Patent is hereby corrected as shown below:

<u>Column 15,</u>
Line 24, delete "all"

Signed and Sealed this

Third Day of May, 2005

JON W. DUDAS
*Director of the United States Patent and Trademark Office*